Feb. 14, 1961 J. W. JOHNSTON 2,971,317
SAFETY CLIP FOR MOWING MACHINE CUTTER ASSEMBLIES
Filed Sept. 26, 1958
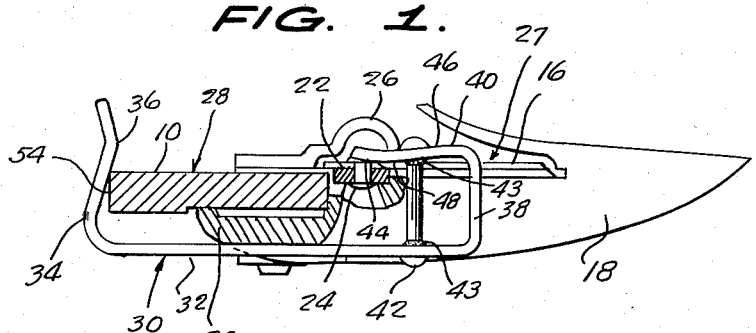
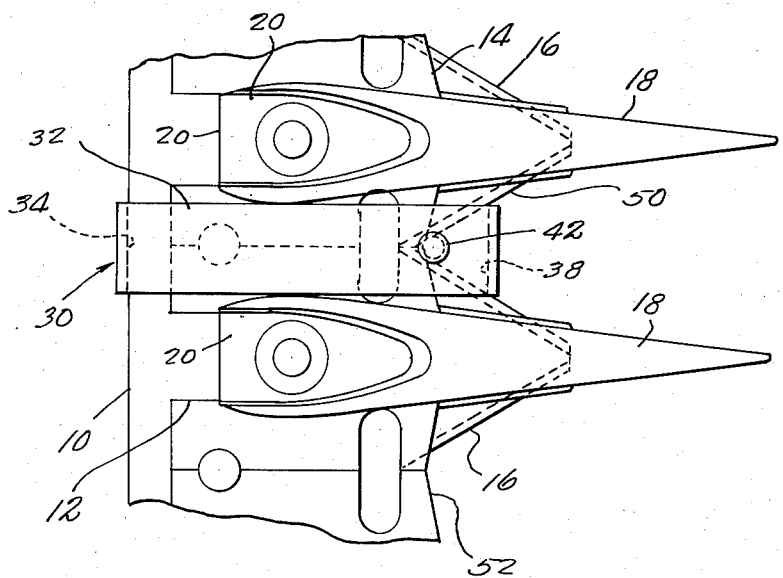
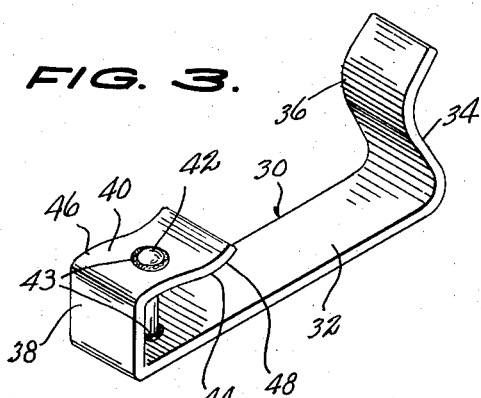
INVENTOR.
JOHN W. JOHNSTON,
BY
McMorrow, Berman & Davidson
ATTORNEYS.

United States Patent Office 2,971,317
Patented Feb. 14, 1961

2,971,317

SAFETY CLIP FOR MOWING MACHINE CUTTER ASSEMBLIES

John W. Johnston, R.F.D. 3, Conneautville, Pa.

Filed Sept. 26, 1958, Ser. No. 763,627

5 Claims. (Cl. 56—296)

This invention relates generally to mowing machines. More particularly, the invention is a safety clip for temporarily preventing relative longitudinal displacement of the finger bar and knife bar of a mowing machine sickle.

A machine of the character described includes a sickle, and it has been noted that the cutting blades tend to slide downwardly when the cutter bar is swung to an upright position, in a manner such as to catch and injure the operator's fingers when he raises the entire blade assembly to said upright position.

This tends to occur by reason of the fact that at the location where the pitman is connected to the knife assembly, stops are provided upon the pitman and cutter bar respectively. These are in the form of lugs, which are spaced a prescribed distance apart, usually one and one-half inches, when the crank wheel is at its limit of movement, that is, when the crank wheel has turned to a point at which its pivotal connection to the pitman is furthest from the cutter bar connection to the pitman.

As a result, when the cutter bar assembly is moved to an upright position, the knife assembly is still permitted to drop downwardly the mentioned distance, as for example one and one-half inches. This particular extent of movement is permitted when both of the stop lugs are in proper condition. However, should one or both of said stop lugs become worn, then the knife assembly tends to drop several inches.

The result is that there is more probability of the mentioned injury to the operator's fingers.

In view of the above, it is proposed to provide a safety clip adapted for attachment to the cutter bar assembly, which clip can be put on when the cutter bar assembly is in its horizontal position upon the ground. The clip is thus adapted to prevent any movement of the knife when the cutter bar is raised to an upright position.

Another object is to provide a clip of the character stated which will not require any modification or redesign of a conventional sickle or cutter bar assembly.

Another object is to permit the device to be engaged with the appropriate, associated components of the sickle swiftly and easily, and without the requirement of special tools.

A further object is to so form the device that it will not damage the mowing machine components on which it is mounted.

Still another object is to permit the clip to be manufactured at a very low cost, considering the highly beneficial results obtainable from the use thereof.

Other objects will appear from the following description, the claims appended thereto, and from the annexed drawing, in which like reference characters designate like parts throughout the several views, and wherein:

Figure 1 is a transverse sectional view through the sickle, showing in side elevation a clip according to the present invention, operatively positioned upon said sickle;

Figure 2 is a fragmentary bottom plan view of the sickle and of the clip mounted thereon; and Figure 3 is a perspective view of the clip per se.

Referring to the drawing in detail, designated at 10 is the usual stationary sickle bar or finger bar, having at its underside shallow recesses 12. At 14 there has been designated the waved or undulating leading edge of the bar 10, and projecting forwardly from said leading edge are the generally triangular reciprocating knives or cutting blades 16, reciprocating relative to forwardly projecting guide fingers 18 having at their rear ends enlargements 20 fixedly secured to the stationary finger bar 10.

A reciprocating cutter bar 22 is secured by rivets 24 to the knives 16, and reciprocates in a path parallel to the length of the stationary finger bar 10 in close proximity to the forward edge of the finger bar. In this way the cutting action occurs. Hold-down clips 26 are fixedly mounted upon and project forwardly from the stationary finger bar 10 in overlying, contacting relation to the knives 16.

The knives 16 and their associated bar 22 comprise a knife assembly generally designated 27, while the finger bar 10 and its associated stationary fingers or guides 18 comprise a stationary support bar assembly generally designated at 28.

It has been found that when the entire assembly is swung to an upright position about its pivotal connection to the pitman, as is often required, the entire knife assembly 27 slips downwardly relative to the stationary finger bar assembly 28. In these circumstances, injury to the operator's finger results. Ordinarily, the downward slippage is limited to one and one-half inches when the stop lugs on the pitman and knife assembly respectively are in good condition. When said lugs are in poor condition, however, even more slippage occurs.

In accordance with the present invention there is provided a safety clip generally designated by the reference numeral 30. This clip includes an elongated, wide length of bar material including a flat body portion 32 which is in underlying relation to the stationary and reciprocating assemblies 27, 28 respectively. The body portion 32 extends transversely of the length of said assemblies as will be noted from Figure 2.

At its rear end, the flat, horizontal body portion 32 is integral with an upwardly projecting rear abutment 34, which is compoundly curved so as to include, intermediate its ends, a rearwardly bowed portion 36.

At the opposite end of the body portion 32 there is provided a front end abutment 38. This is disposed wholly in a plane perpendicular to the plane of the body portion 32, said abutment 38 being flat and approximately square as shown in Figure 3.

Abutment 38, at its upper end, is integral with a rearwardly extending end portion 40, which is in overlying relation to the body portion 32. End portion 40 is connected to the body portion 32 by means of a rivet 42, which is welded at its opposite ends, as at 43, to the body portion 32 and end portion 40.

As will be noted from Figures 1 and 3, the end portion 40 is compoundly curved, having adjacent the abutment 38 a gently upwardly bowed part 46 merging into a gently downwardly bowed distal part 48. The distal part 48 has a convex bottom surface 44 that bears against the top surface of the reciprocating cutting bar 22 as shown in Figure 1.

The purpose of the pin or rivet 42 is to reinforce the clip at its front end.

In use, the clip is applied when the cutter bar assembly is on the ground. As will be observed, the pin 42, in addition to providing a reinforcement, enters between adjacent knives 16, engaging the V-shaped recess 50 defined by the rearwardly convergent, adjacent side edges of said adjacent knives. The rivet also engages at the bottom of one of the undulations 52 formed in the leading edge of the stationary finger bar assembly 28.

The rear end abutment 34, meanwhile, bears against the rear edge 54 of the finger bar 10, with the inwardly bowed distal part 36 of the abutment 34 projecting forwardly over the finger bar to hold the clip assembled with the finger bar.

By reason of the construction illustrated and described, when the clip is applied, the rear end abutment 34 will initially be swung away from the front end portion, sufficient to permit the distal part 36 to move past the finger bar into overlying relation to the finger bar. The abutment 34 is now free to spring back to its original position, and the clip will thus be firmly engaged with the entire stationary and movable assembly in the manner shown in Figures 1 and 2.

When the clip is so engaged, its pin or rivet 42 will engage between adjacent knives and will also engage at the bottom of one of the undulations 52.

The result is that when the cutter bar assembly is swung upwardly to its upper position, there will be no downward movement whatever of the knife assembly 27, since the pin 42 engages the knife assembly 27 and the stationary sickle or finger assembly 28 against relative longitudinal movement. When the cutter bar is thus positioned upright, the clip can be removed, and it is thus seen that there is no possibility of injury to the operator's fingers.

The device is characterized by the ease with which it can be applied or removed, this being important since it is to be a temporary attachment to the sickle assembly. The device has the further desirable characteristic, in that it is applicable to a conventional sickle assembly without requiring any modification or redesign thereof.

Still further, the device is designed to prevent any injury to the operator, during the act of elevating the cutter bar assembly to an upright position, and when acting in this manner the safety clip does not, it will be noted, injure the associated components of the mowing machine in any way.

While achieving the desired results, the clip is of a very inexpensive construction, since it has no moving parts, and can be formed from relatively inexpensive sheet steel, having slightly springable qualities sufficient to permit the aforementioned springable movement of the abutment 34.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A safety clip device for use in combination with a sickle bar assembly comprising a stationary bar having forward and rear longitudinal edges, blades fixed on said bar and extending forwardly beyond said forward edge, said blades being forwardly tapered and having V-shaped notches therebetween, an endwise reciprocable bar mounted along the forward edge of the stationary bar and having forwardly projecting ledger plates overlying and in shearing relation to said blades, said reciprocable bar having an element positioned beneath the stationary bar, said safety clip comprising a flat body portion longer than the distance between the rear edge of the stationary bar and the forward edge of the reciprocable bar, said body portion being engaged with the under side of said element and being downwardly spaced from the stationary bar and the reciprocable bar, an upstanding reclining L-shaped element on the forward end of said body portion comprising a perpendicular standard and a horizontal foot portion, said foot portion extending rearwardly along and being spaced about said body portion and having a free rear end, a rivet extending between and fixed to said foot portion and said body portion, said standard portion being engaged with the sides of a notch between blades and said rivet being engaged in the bottom of the notch, and an upstanding retaining arm on the rear end of said body portion engaged over and tensioned against the rear edge of the stationary bar.

2. A safety clip of the character described comprising an elongated straight body portion having first and second ends, an upstanding reclining L-shaped element on said second end, said element comprising a perpendicular standard portion and a foot portion extending inwardly along and being spaced above said body portion and having a free end, a rivet extending between said body portion and said foot portion and fixed thereto, and an upstanding spring retaining arm on the first end of the body portion.

3. A safety clip of the character described comprising an elongated straight body portion having first and second ends, an upstanding reclining L-shaped element on said second end, said element comprising a perpendicular standard portion and a foot portion extending inwardly along and being spaced above said body portion and having a free end, a rivet extending between said body portion and said foot portion and fixed thereto, and an upstanding spring retaining arm on the first end of the body portion, said foot portion having a longitudinally and convexly bowed under side.

4. A safety clip of the character described comprising an elongated straight body portion having first and second ends, an upstanding reclining L-shaped element on said second end, said element comprising a perpendicular standard portion and a foot portion extending inwardly along and being spaced above said body portion and having a free end, a rivet extending between said body portion and said foot portion and fixed thereto, and an upstanding spring retaining arm on the first end of the body portion, said foot portion having a longitudinally and convexly bowed under side, said retaining arm having an inner end portion angled inwardly and upwardly relative to the body portion, and a free end portion angled outwardly and upwardly relative to the body portion.

5. A safety clip of the character described comprising an elongated straight body portion having first and second ends, an upstanding reclining L-shaped element on said second end, said element comprising a perpendicular standard portion and a foot portion extending inwardly along and being spaced above said body portion and having a free end, a rivet extending between said body portion and said foot portion and fixed thereto, and an upstanding spring retaining arm on the first end of the body portion, said foot portion having a longitudinally and convexly bowed under side, said retaining arm having an inner end portion angled inwardly and upwardly relative to the body portion, and a free end portion angled outwardly and upwardly relative to the body portion, said clip being formed of flat bar stock.

References Cited in the file of this patent

UNITED STATES PATENTS

| | | |
|---|---|---|
| 554,799 | Saulez | Feb. 18, 1896 |
| 1,783,751 | Schubnell | Dec. 2, 1930 |
| 2,456,553 | Churchill | Dec. 14, 1948 |
| 2,667,676 | Sampson | Feb. 2, 1954 |
| 2,736,156 | Hardman | Feb. 28, 1956 |